US 8,248,254 B2

(12) United States Patent
Vogt et al.

(10) Patent No.: US 8,248,254 B2
(45) Date of Patent: **\*Aug. 21, 2012**

(54) METHODS AND SYSTEMS FOR CERTIFYING PROVENANCE OF ALCOHOLIC BEVERAGES

(75) Inventors: Eric Vogt, Belmont, MA (US); Ruth Churchill, Miami, FL (US)

(73) Assignee: EProvenance, LLC, Belmont, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/211,137

(22) Filed: Aug. 16, 2011

(65) Prior Publication Data

US 2012/0019398 A1 Jan. 26, 2012

Related U.S. Application Data

(63) Continuation of application No. 12/022,878, filed on Jan. 30, 2008, now Pat. No. 8,022,832.

(60) Provisional application No. 60/890,149, filed on Feb. 15, 2007.

(51) Int. Cl.
*G08B 17/00* (2006.01)
*G08B 13/14* (2006.01)
*G08B 21/00* (2006.01)
*G01W 1/00* (2006.01)
*G06F 7/00* (2006.01)

(52) U.S. Cl. ............ 340/588; 340/572.1; 340/584; 340/585; 340/601; 340/602; 700/213; 700/214

(58) Field of Classification Search ........... 340/572.1, 340/584, 585, 588, 601, 602; 700/213, 214
See application file for complete search history.

(56) References Cited

U.S. PATENT DOCUMENTS

| 6,050,622 | A | 4/2000 | Gustafson |
| 6,746,053 | B1 * | 6/2004 | Afzali-Ardakani et al. ..... 283/72 |
| 6,982,640 | B2 * | 1/2006 | Lindsay et al. ............... 340/540 |
| 7,034,683 | B2 * | 4/2006 | Ghazarian ................. 340/568.1 |
| 7,075,437 | B2 * | 7/2006 | Bridgelall et al. ......... 340/572.1 |
| 8,022,832 | B2 * | 9/2011 | Vogt et al. ..................... 340/588 |
| 2002/0126057 | A1 | 9/2002 | King et al. |
| 2002/0175818 | A1 | 11/2002 | King et al. |
| 2002/0175873 | A1 | 11/2002 | King et al. |
| 2003/0112192 | A1 | 6/2003 | King et al. |
| 2003/0155413 | A1 | 8/2003 | Kovesdi et al. |
| 2004/0000713 | A1 | 1/2004 | Yamashita et al. |
| 2004/0145474 | A1 * | 7/2004 | Schmidtberg et al. ..... 340/572.1 |
| 2004/0147270 | A1 | 7/2004 | Petrovich |
| 2004/0148117 | A1 | 7/2004 | Kirshenbaum et al. |

(Continued)

OTHER PUBLICATIONS

European Search Report on 08729824.6 dated Mar. 6, 2012.

(Continued)

*Primary Examiner* — Jennifer Mehmood
*Assistant Examiner* — Andrew Bee
(74) *Attorney, Agent, or Firm* — Foley & Lardner LLP

(57) ABSTRACT

A system for certifying provenance of an alcoholic beverage includes a radio-frequency identification tag and a server. The radio-frequency identification tag, associated with a bottle containing an alcoholic beverage, periodically measures a plurality of values of an environmental condition of the bottle. The radio-frequency identification tag stores the plurality of measured values. The server receives the plurality of measured values for analysis. The server provides, via a user interface, a description of a provenance of the alcoholic beverage, the description generated responsive to an analysis of the plurality of measured values.

20 Claims, 11 Drawing Sheets

U.S. PATENT DOCUMENTS

| | | | |
|---|---|---|---|
| 2004/0150521 A1* | 8/2004 | Stilp | 340/545.1 |
| 2005/0003839 A1 | 1/2005 | Tripp | |
| 2005/0060171 A1* | 3/2005 | Molnar | 705/1 |
| 2005/0075145 A1 | 4/2005 | Dvorak et al. | |
| 2005/0086128 A1 | 4/2005 | Shanahan | |
| 2005/0171738 A1 | 8/2005 | Kadaba | |
| 2005/0190111 A1 | 9/2005 | King et al. | |
| 2005/0248455 A1* | 11/2005 | Pope et al. | 340/539.27 |
| 2005/0252966 A1 | 11/2005 | Kulas | |
| 2005/0275591 A1 | 12/2005 | King et al. | |
| 2006/0001525 A1 | 1/2006 | Nitzan et al. | |
| 2006/0001528 A1 | 1/2006 | Nitzan et al. | |
| 2006/0005027 A1 | 1/2006 | Tseng | |
| 2006/0007049 A1 | 1/2006 | Nitzan et al. | |
| 2006/0012464 A1 | 1/2006 | Nitzan et al. | |
| 2006/0032926 A1 | 2/2006 | Baba et al. | |
| 2006/0109123 A1 | 5/2006 | Carrender | |
| 2006/0109130 A1 | 5/2006 | Hattick et al. | |
| 2006/0113369 A1 | 6/2006 | Taylor et al. | |
| 2006/0113370 A1 | 6/2006 | Taylor et al. | |
| 2006/0138223 A1 | 6/2006 | Schar | |
| 2006/0145869 A1 | 7/2006 | Appalucci et al. | |
| 2006/0174667 A1 | 8/2006 | Garner | |
| 2006/0214788 A1* | 9/2006 | Ku et al. | 340/539.26 |
| 2006/0247967 A1 | 11/2006 | Prusik et al. | |
| 2006/0255130 A1* | 11/2006 | Whewell et al. | 235/383 |
| 2006/0261946 A1* | 11/2006 | Himberger et al. | 340/572.1 |
| 2006/0261950 A1* | 11/2006 | Arneson et al. | 340/572.1 |
| 2006/0280007 A1 | 12/2006 | Ito et al. | |
| 2006/0290496 A1 | 12/2006 | Peeters | |
| 2007/0001916 A1 | 1/2007 | King et al. | |
| 2007/0057768 A1 | 3/2007 | Zeng et al. | |
| 2007/0058804 A1 | 3/2007 | Kadaba | |
| 2007/0069895 A1 | 3/2007 | Koh | |
| 2007/0095905 A1 | 5/2007 | Kadaba | |
| 2007/0109132 A1 | 5/2007 | Sano et al. | |
| 2007/0125296 A1 | 6/2007 | Taylor et al. | |
| 2007/0171139 A1 | 7/2007 | King et al. | |
| 2007/0181602 A1 | 8/2007 | Taradalsky | |
| 2007/0184898 A1 | 8/2007 | Miller et al. | |
| 2007/0192216 A1 | 8/2007 | Arnold et al. | |
| 2007/0194931 A1 | 8/2007 | Miller et al. | |
| 2007/0217717 A1 | 9/2007 | Murray | |
| 2007/0243618 A1 | 10/2007 | Hatchett et al. | |
| 2007/0284333 A1* | 12/2007 | Dunnigan | 215/386 |
| 2008/0218348 A1* | 9/2008 | August et al. | 340/572.1 |

OTHER PUBLICATIONS

Gadi Hoenig Anti-Counterfeiting Technology Could Protect Wine and Proftis. Wine Business Online-Wine Business Monthly. Retrieved from the Internet on Oct. 21, 2008 from http://www.winebusiness.com/wbm/?go=getArticle&dataid=17438.

International Search Report PCT/US08/53916 mailed on Oct. 24, 2008.

International Preliminary Report on Patentability PCT/US08/53916 mailed on Aug. 19, 2009.

Lister, Ella. "Summer Sums." The World of Fine Wine. Issue 30. 2010: 199-209.

Mort Hochstein Beyond the Wine Label. Wine Business Online-Wine Business Monthly. Retrieved from the Internet on Oct. 21, 2008 from http://www.winebusiness.com/wbm/?go=getArticle&dataid=43158.

New Zealand Examination Report on 579400 dated Mar. 18, 2011.

Non-Final Office Action, USPTO, U.S. Appl. No. 12/022,844, Mar. 9, 2010.

Non-Final Office Action, USPTO, U.S. Appl. No. 12/022,887, Mar. 10, 2010.

Non-Final Office Action, USPTO, U.S. Appl. No. 12/022,890, Mar. 9, 2010.

Notice of Allowance on U.S. Appl. No. 12/022,878 dated Jun. 14, 2011.

Office Action on U.S. Appl. No. 12/022,878 dated Nov. 16, 2010.

Office Action on U.S. Appl. No. 12/022,878 dated Mar. 9, 2010.

Office Action on U.S. Appl. No. 12/022,878 dated Jul. 7, 2010.

Robinson, Jancis, "The Growing Gulf in the World of Fine Wine." Financial Times [London, United Kingdom] Jun. 19, 2010.

Rose, Anthony, and Richard Woodard. "The Weakest Link." Decanter.com Jul. 2010: 42-44.

Tina Caputo RFID Technology Beyond Wal-Mart, Gale Group Trade & Industry DB, Sep. 2005.

WFLO Commodity Storage Manual, Wines. Revised 2008.

Written Opinion of the International Searching Authority, PCT/US08/53916, mailed on Oct. 24, 2008.

* cited by examiner

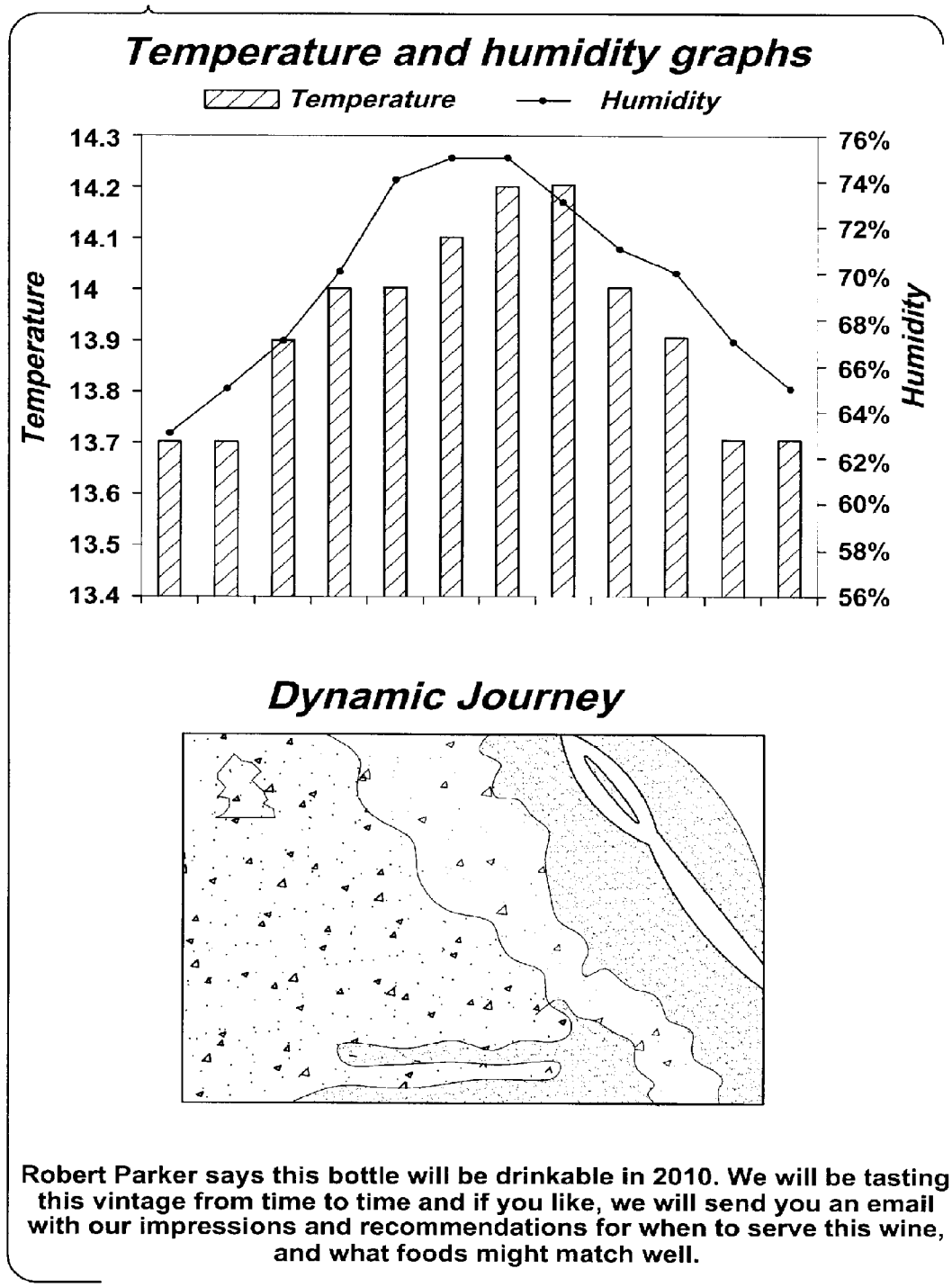

METHODS AND SYSTEMS FOR CERTIFYING PROVENANCE OF ALCOHOLIC BEVERAGES

RELATED APPLICATIONS

The present application is a continuation of U.S. patent application Ser. No. 12/022,878, entitled "Methods and Systems for Certifying Provenance of Alcoholic Beverages" filed Jan. 30, 2008, which claims priority to U.S. Provisional Patent Application Ser. No. 60/890,149, entitled "Impeccable and Efficient Distribution of Wines Combined With Consumer Insight" filed Feb. 15, 2007, which is incorporated herein by reference.

FIELD OF THE INVENTION

The present disclosure relates to methods and systems for certifying provenance of alcoholic beverages. In particular, the present disclosure relates to methods and systems for certifying provenance of an alcoholic beverage by tracking environmental conditions of a bottle containing the alcoholic beverage during its progress through a distribution channel.

BACKGROUND OF THE INVENTION

Each year, 38 billion bottles of wine are produced in the world. The most critical component of certifiable value to the consumer, provenance (typically defined as authenticity, traceability and knowledge of storage temperatures), is anecdotal at best, and unverifiable. When a winemaker ships wine to a consumer, there are various intermediaries between the wine maker and the end consumer, including master distributors, negociants, importers, wholesalers, wine retailers and restaurants. Many of these entities are customers of the previous entity in this distribution channel and in between them all are various forms of shippers and movers. Untracked temperature fluctuations during transport can harm the quality of this asset, yet no standard methods for temperature monitoring exist through this process. Wine producers care profoundly about the quality of their wines—it is the mainstay of the value of their brand. Yet they have had no way to consistently monitor the care given to their products in transit.

Furthermore, as fine wine increases in value, the sophistication of counterfeiting efforts grows, more and more counterfeit bottles are appearing, and many of these counterfeits go undiscovered. As it becomes more difficult, especially for the average wine consumer, to discern authentic from counterfeit, the need for winemakers to protect their brand, by enabling consumers to feel sure that they have an authentic bottle, mounts.

Additionally, counterfeit bottles are disruptive to the secondary markets such as fine wine auctions. Increasing amounts of testing are required for participation in fine wine auctions, especially by the more well known houses, such as Sotheby's. Many auctions planned over long periods of time have had to be cancelled or modified due to the unexpected discovery of counterfeit bottles in a collector's cellar. The ensuing legal battles from these discoveries result in negative publicity for all involved and may reduce the number of participants in fine wine auctions.

Counterfeiting is a serious issue among spirits as well as wines. The spirits market consists of the sale of brandy, gin & genever, liqueurs, rum, specialty spirits, tequila & mezcal, vodka and whisky. The global spirits market generated total revenues of $179.7 billion in 2005. Exports of all European spirits such as whisky and vodka to China reached €200m in 2007, from just €8m in 1999. In November of 2007, a quarter of all spirits brands claiming to be of European origin now sold in China are counterfeit, according to Jamie Fortescue, director general of the European Spirits Organisation. Fortesque stresses that the problem of fake brands is not unique to China—or for that matter Asia—by adding that there were also growing concerns regarding counterfeiting of alcohol in many Eastern European nations among others.

Manufacturing similar-looking counterfeit bottles, labels and capsules is also a common practice. In this case, a high-volume manufacturing operation produces a counterfeit alcoholic beverage and fills the counterfeit bottles, complete with counterfeit labels and capsules, with the counterfeit beverage. It may be difficult to distinguish a counterfeit bottle and its contents from an authentic bottle and its contents without opening the bottle and analysing the contents.

Refilling authentic spirits bottles with counterfeit beverages is a frequently used method in the counterfeiting of spirits. Conventional methods to validate content have to this point required chemical testing and typically require opening the bottle. Counterfeit spirits often include considerable health issues as substances such as methanol are known to be used in the production of the counterfeit beverages. Methanol can create health issues such as severe abdominal pain, drowsiness, dizziness, blurred vision leading to blindness, and coma with breathing difficulties. The symptoms of methanol poisoning can be delayed for several hours further obfuscating cause and effect conclusions.

Spirits can have considerably higher alcohol content than wine; some even in the 30% range. As such "freezing" temperatures are less of an issue with spirits than with wines, but temperature-controlled containers for shipping are still required for most spirits especially in warmer climates and seasons to avoid issues with heat. Spirits, like wines, can be "cooked" at higher temperatures.

BRIEF SUMMARY OF THE INVENTION

In one aspect, a method for certifying provenance of alcoholic beverages by tracking environmental conditions of a bottle containing the alcoholic beverage during its progress through a distribution channel includes the step of measuring, periodically, by a radio-frequency identification tag associated with a bottle containing an alcoholic beverage, a plurality of values of an environmental condition of the bottle. The method includes the steps of storing, by the radio-frequency identification tag, the plurality of measured values of the environmental condition and of receiving, by a server, the plurality of measured values for analysis. The method includes the step of providing, by the server, via a user interface, a description of a provenance of the alcoholic beverage in the bottle, the description generated responsive to an analysis of the received plurality of measured values.

In one embodiment, the radio-frequency identification tag measures, upon receipt of the bottle by a channel member, the value of the environmental condition of the bottle. In another embodiment, the radio-frequency identification tag measures, during transit to a channel member, the value of the environmental condition of the bottle. In still another embodiment, a sensor in the radio-frequency identification tag measures an ambient temperature of the bottle. In still even another embodiment, a sensor associated with the radio-frequency identification tag identifies a location of the bottle. In yet another embodiment, a sensor in the radio-frequency identification tag measures a level of humidity.

In one embodiment, the server provides, via the user interface, to a purchaser of the bottle, the description of the provenance of the alcoholic beverage. In another embodiment, the server provides, via the user interface, to a producer of the alcoholic beverage in the bottle, the description of the provenance of the alcoholic beverage. In still another embodiment, the server provides, via the user interface, to a distributor of the bottle, the description of the provenance of the alcoholic beverage.

In another aspect, a system for certifying provenance of an alcoholic beverage by tracking environmental conditions of a bottle containing the alcoholic beverage during its progress through a distribution channel includes a server and a radio-frequency identification tag associated with a bottle containing an alcoholic beverage. The radio-frequency identification tag measures, periodically, a plurality of values of an environmental condition of the bottle and stores the plurality of measured values of the environmental condition. The server receives the plurality of measured values for analysis and provides, via a user interface, a description of a provenance of the alcoholic beverage, the description generated responsive to an analysis of the received plurality of measured values.

In one embodiment, the radio-frequency identification tag includes a sensor for measuring temperature. In another embodiment, the radio-frequency identification tag includes a sensor for measuring a level of humidity. In still another embodiment, the radio-frequency identification tag includes a sensor for measuring a level of vibration of the bottle. In yet another embodiment, the radio-frequency identification tag is associated with a global positioning system receiver attached to the bottle and identifying a location of the bottle.

In still another aspect, a method for authenticating the contents of a bottle containing an alcoholic beverage during its progress through a distribution channel includes the step of authenticating, periodically, by a first reader, a neck seal of a bottle containing an alcoholic beverage by detecting an invisible security taggant deposited on the neck seal. The method includes the steps of retrieving, periodically, by a second reader, from a radio-frequency identification tag, a bottle tag number. The method includes the steps of authenticating, by the server, the contents of the bottle responsive to identifying an association between a neck seal identification number imprinted on the neck seal and the retrieved bottle tag number.

In yet another aspect, a system for authenticating contents of a bottle during its progress through a distribution channel includes a neck seal, a first reader, a second reader, and a server. The neck seal is attached to a bottle containing an alcoholic beverage and includes a neck seal identification number and an invisible security taggant. The first reader periodically scans the neck seal, detects the presence of the security taggant, and authenticates the neck seal. The second reader periodically retrieves, from a radio-frequency identification tag, a bottle tag number. The server authenticates the contents of the bottle responsive to identifying an association between the neck seal identification number and the retrieved bottle tag number.

In one embodiment, the second reader is a radio-frequency identification tag reader. In another embodiment, a bar code inscribed on the neck seal is associated, during a bottling process, with the bottle tag number stored by a radio-frequency identification tag attached to the bottle. In still another embodiment, the invisible security taggant includes an authentication code detectable by the first reader.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 2C is a screen shot depicting one embodiment of a user interface provided by a server and displaying statistical data generated responsive to the analysis of the plurality of measurements;

DETAILED DESCRIPTION OF THE INVENTION

Figure 1A:
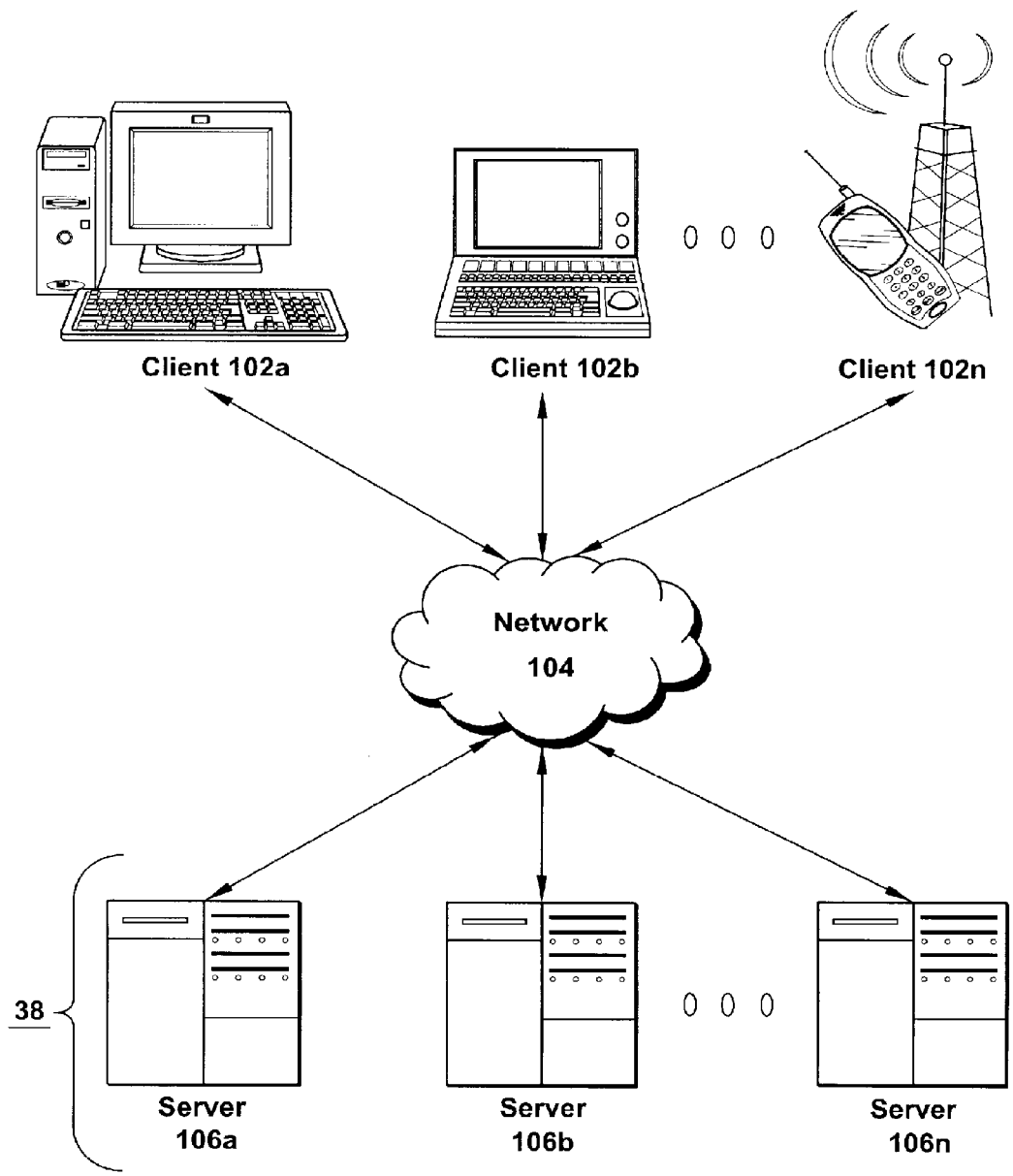
FIG. 1A is a block diagram depicting an embodiment of a network environment comprising local machines in communication with remote machines.

Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104.

The servers 106 may be geographically dispersed from each other or from the clients 102 and communicate over a network 104. The network 104 can be a local-area network (LAN), such as a company Intranet, a metropolitan area network (MAN), or a wide area network (WAN), such as the Internet or the World Wide Web. The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 and network topology may be of any such network or network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

A server 106 may be referred to as a file server, application server, web server, proxy server, or gateway server. In one embodiment, the server 106 provides functionality of a web server. In some embodiments, the web server 106 comprises an open-source web server, such as the APACHE servers maintained by the Apache Software Foundation of Delaware. In other embodiments, the web server executes proprietary software, such as the Internet Information Services products provided by Microsoft Corporation of Redmond, Wash., the SUN JAVA web server products provided by Sun Microsystems, of Santa Clara, Calif., or the BEA WEBLOGIC products provided by BEA Systems, of Santa Clara, Calif.

The clients 102 may be referred to as client nodes, client machines, endpoint nodes, or endpoints. In some embodiments, a client 102 has the capacity to function as both a client node seeking access to resources provided by a server and as a server providing access to hosted resources for other clients 102a-102n. A client 102 may execute, operate or otherwise provide an application, which can be any type and/or form of software, program, or executable instructions such as any type and/or form of web browser, web-based client, client-server application, an ActiveX control, or a Java applet, or any other type and/or form of executable instructions capable of executing on client 102. The application can use any type of protocol and it can be, for example, an HTTP client, an FTP client, an Oscar client, or a Telnet client.

Figure 1B:
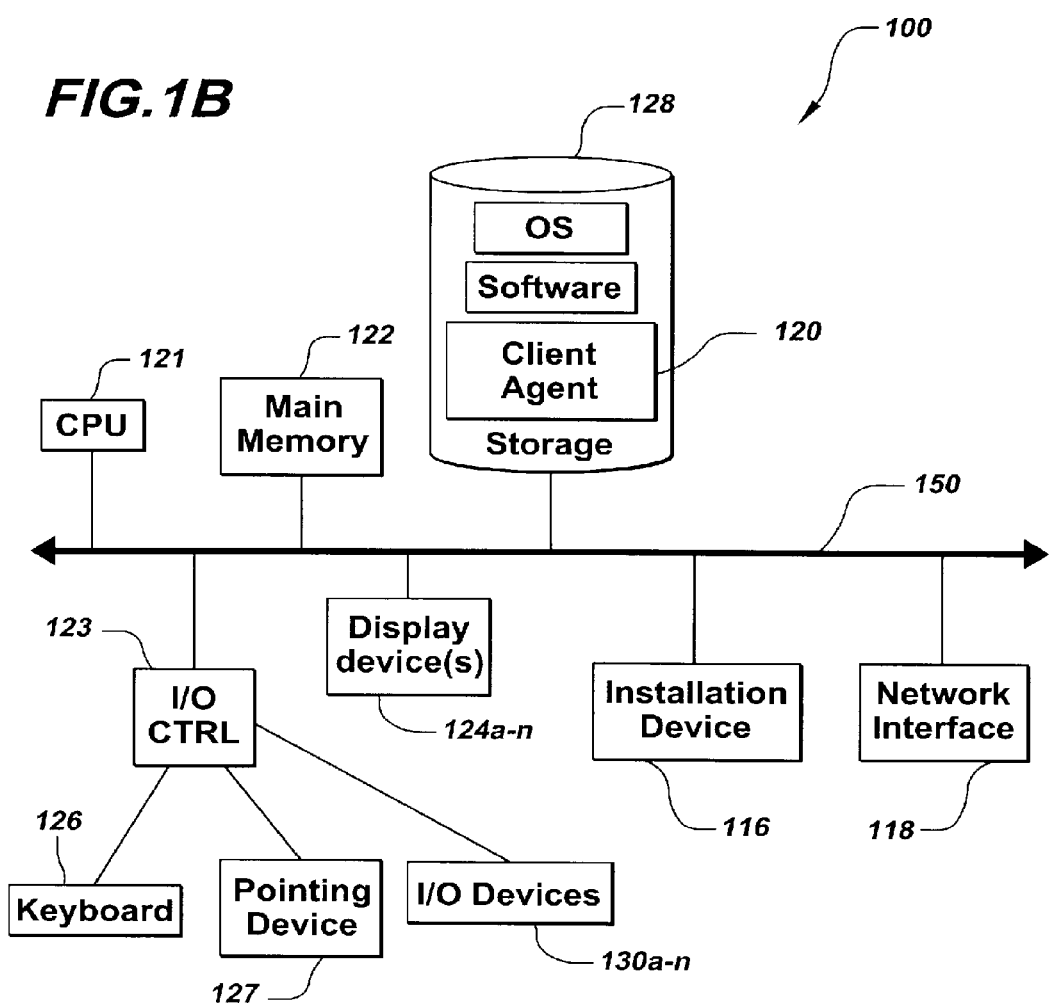
FIG. 1B is a block diagram depicting one embodiment of a computing device useful in connection with the methods and systems described herein.

The client 102 and server 106 may be deployed as and/or executed on any type and form of computing device, such as a computer, network device or appliance capable of communicating on any type and form of network and performing the operations described herein. FIG. 1B depicts a block diagram of a computing device 100 useful for practicing an embodiment of the client 102 or a server 106. As shown in FIG. 1B, each computing device 100 includes a central processing unit 121, and a main memory unit 122. As shown in FIG. 1B, a computing device 100 may include a visual display device 124, a keyboard 126 and/or a pointing device 127, such as a mouse.

The central processing unit 121 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

The computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIG. 1B typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, and WINDOWS VISTA, all of which are manufactured by Microsoft Corporation of Redmond, Wash.; MACOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others. A server 106 and a client 102 may be heterogeneous, executing different operating systems.

In some embodiments, the computing device 100 may have different processors, operating systems, and input devices consistent with the device. For example, in one embodiment the computing device 100 is a TREO 180, 270, 1060, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95cl, or the iM1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, or the Blackberry PEARL 8100. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 comprises a combination of devices, such as a mobile phone combined with a digital audio player or portable media player. In one of these embodiments, the computing device 100 is a Motorola RAZR or Motorola ROKR line of combination digital audio players and mobile phones. In another of these embodiments, the computing device 100 is an iPhone smartphone, manufactured by Apple Computer of Cupertino, Calif.

Figure 2A:
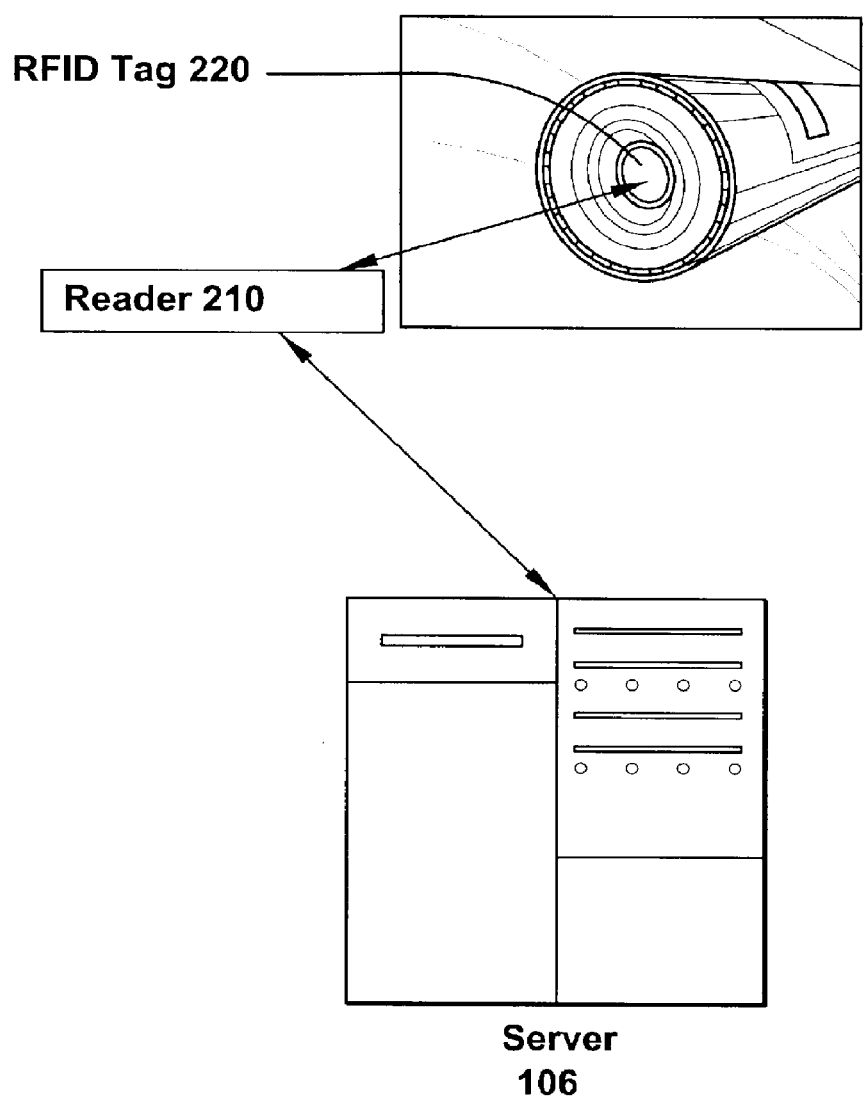
FIG. 2A is a block diagram depicting one embodiment of a system for certifying provenance of alcoholic beverages by tracking environmental conditions of a bottle containing an alcoholic beverage during its progress through a distribution channel.

Referring now to FIG. 2A, a block diagram depicts one embodiment of a system for certifying provenance of an alcoholic beverage by tracking environmental conditions of a bottle containing the alcoholic beverage during its progress through a distribution channel. The system includes a radio-frequency identification (REID) tag 220, a reader 210, and a server 106. The RFID tag 220 is associated with a bottle containing an alcoholic beverage, measures a plurality of values of an environmental condition of the bottle and stores the plurality of measured values of the environmental condition. The server 106 receives the plurality of measured values for analysis and provides, via a user interface, a description of a provenance of the alcoholic beverage, the description generated responsive to an analysis of the received plurality of measured values. The alcoholic beverage may include, without limitation, wine, spirits, malt liquor and other alcoholic beverages.

Verifiable provenance of fine wine, spirits, malt liquor and other alcoholic beverages, in terms of the quality of storage, authenticity, and traceability of each bottle containing the alcoholic beverage, demonstrably increases the value of the alcoholic beverage. In one embodiment, a system for certifying provenance of alcoholic beverages by tracking environmental conditions of a bottle containing an alcoholic beverage during its progress through a distribution channel provides components for measuring conditions that impact provenance and for verifying provenance of the bottle containing the alcoholic beverage based upon analyses of the measured conditions. In another embodiment, the system includes a passive RFID tag attached to the base, body, or label of the bottle and a neck seal with coded covert ink around the base of each capsule. In still another embodiment, the system includes a bar code label attached to the body or label of the bottle and a neck seal with coded covert ink around the base of each capsule. In still even another embodiment, a case storing the bottle is equipped with an active RFID tag that periodically measures an environmental condition of the bottle, such as temperature. In yet another embodiment, the information recorded by the tags and associated with the bottle allows members of the distribution channel, retail salespeople, sommeliers in restaurants, and consumers alike to interact with the bottle to review and verify information such as provenance, harvest data, the blend, maturation, optimal drinking dates, as well as ratings and tasting notes.

In one embodiment, the reader 210 retrieves the plurality of measured values from the RFID tag 220 and transmits the plurality of measured values to the server 106. In another embodiment, the reader 210 is used to energize a power source on the RFID tag 220. In still another embodiment, the reader 210 is used to activate an RFID tag 220 configured to measure environmental conditions. In yet another embodiment, the reader 210 reads the information being tracked and stored by the RFID tag 220. In some embodiments, the reader 210 is a reader such as those produced by Feig Electronic GmbH of Weilburg, Germany, by Motorola Corporation of Schaumburg, Ill., USA, EmbedTech Industries, Inc., of Raymond, Me., USA, or by KSW Microtec AG of Dresden, Germany. In some embodiments, the reader 210 is a combination RFID-tag reader and bar-code scanner.

Radio-Frequency Identification (RFID) is a method of automatic identification using radio waves. In one embodiment, the RFID tag 220 includes a circuit for storing information. In another embodiment, the RFID tag 220 includes an antenna for transmitting information. In still another embodiment, the RFID tag 220 is an active tag, including a power source. In yet another embodiment, the RFID tag 220 is a passive tag and does not require a power source.

In some embodiments, the RFID tag 220 has memory capacity. In one of these embodiments, the RFID tag 220 having memory capacity functions may store significant amounts of data and provides functionality analogous to an electronic bar code. In other embodiments, information can be added to the RFID tag 220 as it goes through the distribution channel (e.g., environmental data on different dates). In still other embodiments, the RFID tag 220 can be queried and read without direct line-of-sight. In one of these embodiments, because the RFID tag 220 can be inside the case and an RFID reader can read the information on the tag without opening the case.

In other embodiments, the RFID tag 220 can be configured to attach to and fit on various sized objects, including the well of a bottle. In one of these embodiments, the RFID tag 220 may be incorporated into an object during its production including into or on the neck, cork, body, label or well of a bottle. RFID technology can be combined with various other devices, such as Global Positioning Systems and temperature sensors to enable the capture and sensing of the data desired to be handled by instrumentation within the same packing. The continuing decrease in the size of RFID technology enables discernment of its presence to be unobvious to potential pilferers. The capacity to include remote alarming capacity with RFID further deters pilfering.

The RFID tag 220 is associated with the bottle. In one embodiment, depicted in FIG. 2A, the RFID tag 220 is attached to the bottle. In another embodiment, the RFID tag 220 is embedded in the bottle; for example, the RFID tag 220 may be embedded into the glass of a glass bottle. In still another embodiment, the RFID tag 220 is attached to a case storing the bottle (not shown). In yet another embodiment, the RFID tag 220 is attached to a shipping pallet storing the bottle (not shown). The RFID tag 220 can be part of the bottle label, may be a separate label that is attached to the bottle, or it can be incorporated into the neck seal. In some embodiments, the RFID tag 220 is embedded in a bottle capsule of the bottle. In other embodiments, the RFID tag 220 is associated with a bar code which may be imprinted on the bottle label, on a separate label that is attached to the bottle or incorporated into the neck seal of the bottle, as described in greater detail below in connection with FIGS. 4-5.

In one embodiment, the RFID tag 220 includes a sensor for measuring the plurality of values of the environmental condition. In another embodiment, the RFID tag 220 includes a sensor for measuring temperature. In still another embodiment, the RFID tag 220 includes a sensor for measuring humidity. In still even another embodiment, the RFID tag 220 includes a sensor for measuring vibration. In yet another embodiment, the RFID tag 220 includes a sensor for identifying location. In some embodiments, the RFID tag 220 includes a sensor for measuring a level of ambient light. In one of these embodiments, the RFID tag 220 includes a sensor for measuring a level of ultraviolet light.

In some embodiments, the RFID tag 220 is referred to as a promiscuous tag. In one of these embodiments, the RFID tag 220 responds to all requests for data stored on the RFID tag 220. In other embodiments, the RFID tag 220 is referred to as a secure tag. In one of these embodiments, the RFID tag 220 requires authentication prior to responding to a request, for example via passwords or secure keys. In still other embodiments, the RFID tag 220 is a tag such as those used in the RFID-embedded tags produced by EmbedTech Industries, Inc., of Raymond, Me., or by KSW Microtec AG of Dresden, Germany. In still even other embodiments, the RFID tag 220 is a tag such as the VARIOSENSE line of tags or the passive RFID transponders produced by KSW Microtec AG of Dresden, Germany. In embodiments in which the bottle includes a bar code label, the bar code label may be a label such as the line of labels produced by Zebra Technologies Corp. of Vernon Hills, Ill., USA.

In some embodiments, a single RFID tag 220 is used. In one of these embodiments, an active RFID tag 220 is attached to a bottle. In another of these embodiments, the RFID tag 220 collecting and storing the measurements of environmental conditions is attached to a case or vehicle storing the bottle and an identification of the RFID tag 220 is attached to the bottle; for example, the bottle may include an identification number of the RFID tag 220 attached to a case or vehicle, the identification number printed on the bottle or encoded by a bar code that is on the bottle.

In other embodiments, a plurality of active RFID tags 220 are used. In one of these embodiments, and for example, a first active RFID tag 220 attached to a bottle may measure a temperature of the bottle while a second active RFID tag 220' attached to a case storing the bottle or to a vehicle transporting the bottle may measure a level of vibration and a geographic location of the bottle. In still other embodiments, a plurality of passive RFID tags 220 are used. In still even other embodiments, a plurality of RFID tags 220 are used, some of which are active and some of which are passive. In one of these embodiments, and for example, a passive RFID tag 220 is attached to a bottle and an active RFID tag 220' is attached to a case storing the bottle; the two tags may be associated so that, for example, a passive tag includes an identification number for a bottle and the identification number is associated with a plurality of measurements of environmental conditions made by a tag attached to a case.

The server 106 receives the plurality of measured values for analysis. In one embodiment, the server 106 is a computing device 100 as described above in connection with FIGS. 1A and 113. The server 106 provides, via a user interface, a description of a provenance of the alcoholic beverage, the description generated responsive to an analysis of the received plurality of measured values. In one embodiment, the server 106 provides confirmation that identification numbers associated with the bottle and provided by the user—such as a bottle identification number or a neck seal identification number—are valid for a certain winery or alcohol producing facility.

In one embodiment, the server 106 generates statistical data from at least one of the plurality of measured values. For example, and in another embodiment, the server 106 generates an average temperature for a case storing a plurality of bottles containing alcoholic beverages, using a plurality of measured temperatures measured by a sensor and stored in the RFID tag 220. In still another embodiment, the server 106 stores extreme values and the time/date that the extreme conditions started and ended.

In some embodiments, the server 106 selects a description of a provenance of the alcoholic beverages from a plurality of stored descriptions. In one of these embodiments, the server 106 selects the description based upon the plurality of measured values. In another of these embodiments, the server 106 selects the description of the alcoholic beverage based upon a determination that the plurality of measured values satisfies a criterion required for association of the alcoholic beverage with the selected description. For example, and in still another of these embodiments, the server 106 selects a positive description of an alcoholic beverage, responsive to determining that the plurality of measured values of an ambient temperature of a bottle containing the alcoholic beverage result in an average ambient temperature of the bottle falling within a range acceptable for providing a positive description of the provenance of the alcoholic beverage.

In one embodiment, the server 106 includes a receiver, in communication with the RFID tag reader 210. In another embodiment, the server 106 receives the plurality of measured values stored on the RFID tag 220 from the RFID tag reader 210 transmitting the plurality of measured values to the receiver on the server 106.

In some embodiments, a database storing measurements and data for use in generating descriptions receives the plurality of measured values from the server. In one of these embodiments, the database stores data in an ODBC-compliant database. For example, the database may be provided as an ORACLE database, manufactured by Oracle Corporation of Redwood Shores, Calif. In another of these embodiments, the database can be a Microsoft ACCESS database or a Microsoft SQL server database, manufactured by Microsoft Corporation of Redmond, Wash. In still another of these embodiments, the database may be a custom-designed database based on an open source database such as the MYSQL family of freely-available database products distributed by MySQL AB Corporation of Uppsala, Sweden, and Cupertino, Calif.

In one embodiment, the server 106 provides the functionality of a web server. In another embodiment, the server 106 generates a user interface for display over the Internet to a user. In still another embodiment, the user interface includes an interface element displaying to the user the plurality of measured values. In still even another embodiment, the user interface includes an interface element displaying to the user the statistical data generated responsive to the plurality of measured values. In yet another embodiment, the user interface displays a graphical representation of the plurality of measured values.

Figure 2B:
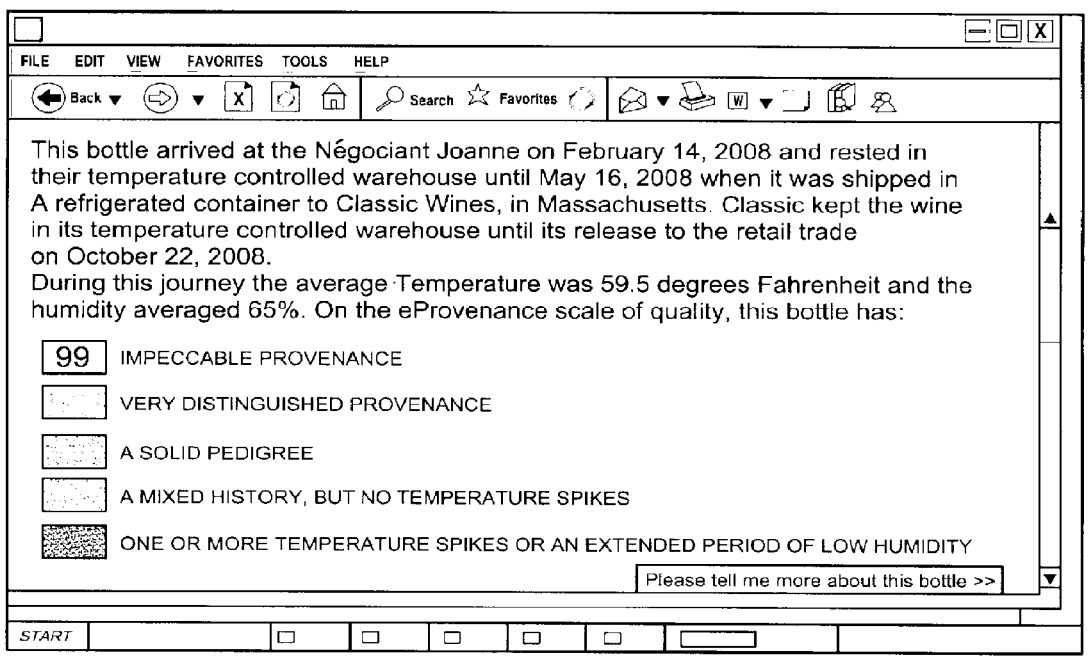
FIG. 2B is a screen shot depicting one embodiment of a user interface provided by a server and displaying a description of a provenance of an alcoholic beverage.

Referring now to FIG. 2B, a screen shot depicts one embodiment of a user interface provided by a server and displaying a description of a provenance of an alcoholic beverage. In one embodiment, data displayed to a user includes, but is not limited to, a grading of the degree of provenance of the alcoholic beverage, a description of the route traveled by the bottle, data on the level of vibration encountered on route, and dates and times of arrival at various locations. In some embodiments, displayed data includes a bottle identification number, a neck seal identification number, an identification of an alcohol-producing facility with which the bottle is registered, a bottling date, and a shipping date.

Referring now to FIG. 2C, a screen shot depicts one embodiment of a user interface provided by a server and displaying statistical data generated responsive to the analysis of the plurality of measurements. In one embodiment, data displayed to a user includes, but is not limited to, charts of environmental conditions the case or bottle has encountered in transit and data on the brand and vintage of the alcoholic beverage (shown as wine in FIG. 2C) including tasting notes, harvest date and blend. In another embodiment, the displayed data is gathered from various sources other than the RFID tag 220. For example, and in still another embodiment, data displayed can include a software model or representation of the Earth, such as that provided by the GOOGLE EARTH mapping service. In still even another embodiment, the data displayed provides a user with additional information regarding the history of the alcoholic beverage, including where and how it was made and by whom. For example, and in yet another embodiment, the data may include graphical information, such as a set of images providing a viewer with a virtual tour of a winery making the wine.

Figure 2D:
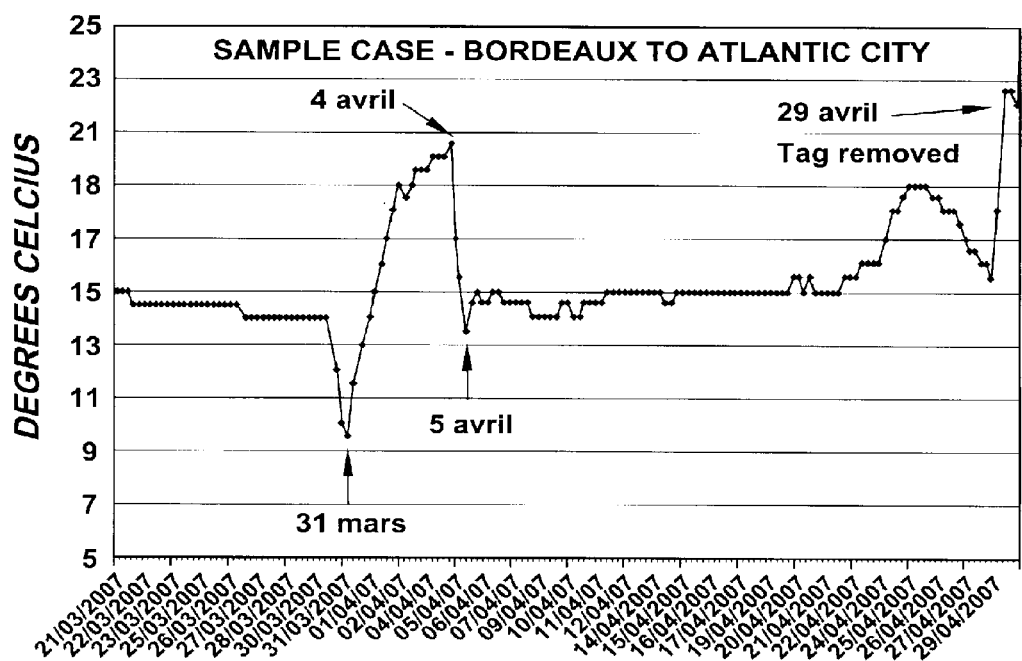
FIG. 2D is a screen shot depicting one embodiment of a user interface provided by a server and displaying a plurality of measured values.

Referring now to FIG. 2D, a screen shot depicts one embodiment of a user interface provided by a server and displaying a plurality of measured values. In one embodiment, data displayed to a user includes, but is not limited to, temperature data displayed over time marked by specific dates, such as the graph of temperatures shown in FIG. 2D. In another embodiment, date-based data can similarly be displayed for any other measures taken, including levels of humidity, light, and vibration.

Figure 3:
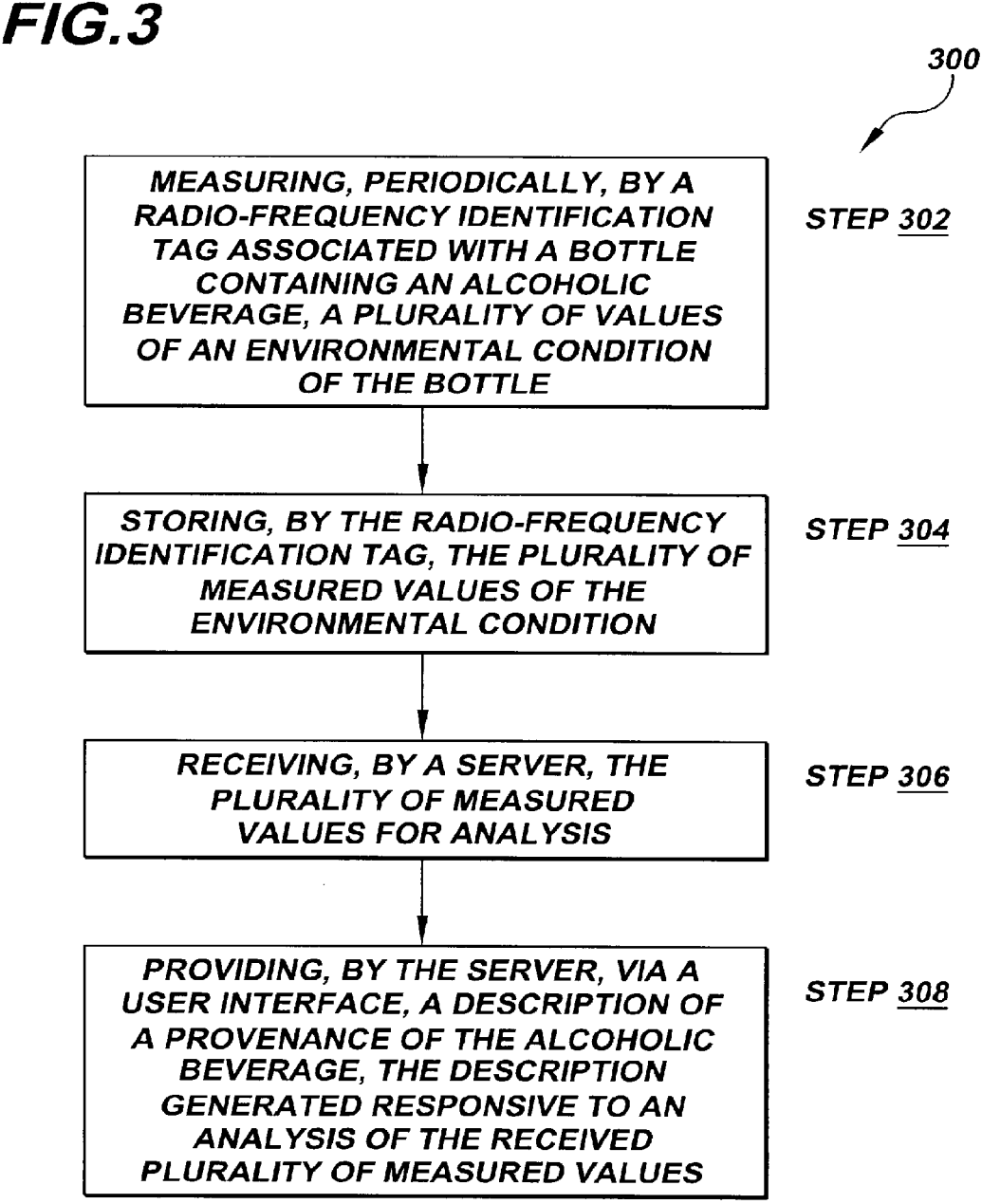
FIG. 3 is a flow diagram depicting one embodiment of the steps taken in a method for certifying provenance of an alcoholic beverage by tracking environmental conditions of a bottle containing the alcoholic beverage during its progress through a distribution channel.

Referring now to FIG. 3, a flow diagram depicting one embodiment of the steps taken in a method for certifying provenance of an alcoholic beverage by tracking environmental conditions of a bottle containing the alcoholic beverage during its progress through a distribution channel. The method includes the step of measuring, periodically, by a radio-frequency identification tag associated with a bottle containing an alcoholic beverage, a plurality of values of an environmental condition of the bottle (step 302). The method includes the step of storing, by the radio-frequency identification tag, the plurality of measured values of the environmental condition (step 304). The method includes the step of receiving, by a server, the plurality of measured values for analysis (step 306). The method includes the step of providing, by the server, via a user interface, a description of a provenance of an alcoholic beverage in the bottle, the description generated responsive to an analysis of the received plurality of measured values (step 308).

Referring now to FIG. 3, and in greater detail, a radio-frequency identification tag associated with a bottle containing an alcoholic beverage periodically measures a plurality of values of an environmental condition of the bottle containing the alcoholic beverage (step 302). As described above in connection with FIGS. 2A-2D, the RFID tag 220 and any associated sensors, including additional RFID tags 220' or devices such as Global Positioning System receivers, can be attached to or incorporated in individual bottles, or attached to cases, pallets or a vehicle or container of shipment, including trucks or shipping containers. In one embodiment, a plurality of RFID tags 220 is associated with a bottle. In another embodiment, an RFID tag 220 is associated with a bottle when it is attached to or embedded in an individual bottle. In still another embodiment, an RFID tag 220 is associated with a bottle when it is attached to a case storing the bottle. In yet another embodiment, an RFID tag 220 is associated with a bottle when it is attached to a vehicle or container of shipment.

In one embodiment, an RFID tag 220 may be an active RFID tag including a sensor for making a measurement of a value of an environmental condition. In another embodiment, the RFID tag 220 is a passive RFID tag associated with a sensor or second RFID tag 220' making the measurements. In some embodiments, an environmental condition is a condition or attribute of the bottle such as temperature, level of humidity, level of vibration, level of light, geographic location, or other condition. In other embodiments, a plurality of measurements is made of a single environmental condition. In one of these embodiments, an RFID tag 220 may make a daily temperature measurement. In still other embodiments, a plurality of measurements is made for each of a plurality of environmental conditions. In one of these embodiments, an RFID tag 220 makes a daily temperature measurement and a GPS receiver makes an hourly recording of geographic location. In another of these embodiments, the plurality of measurements is taken at the same time intervals. In still another of these embodiments, the plurality of measurements are taken at differing time intervals.

In one embodiment, the RFID tag 220 measures the plurality of values of the environmental condition of the bottle upon receipt of the bottle by a channel member. In another embodiment, the RFID tag 220 measures the plurality of values of the environmental condition of the bottle during transit of the bottle to a channel member. In still another embodiment, measurements are often made daily while in transit to create a time line of environmental conditions and/or location on a timeline. In still even another embodiment, measurements can continue to be taken at each point of storage as desired by the appropriate member of the channel, including the end customer who can continue to measure the conditions once they take possession of the bottle. In yet another embodiment, the timing of taking measurements on any environmental condition (temperature, humidity, vibration, light levels, etc.) or geographical location can be customized to extend the life of the battery and/or ensuring reading and tracking of environmental conditions or geographical location during a particular point in time where disparity in the shipping quality may be suspected.

In some embodiments, a bar code label is associated with a bottle. In one of these embodiments, the bar code label is attached to the bottle. In another of these embodiments, the bar code label is attached to a case storing the bottle. In still another of these embodiments, the bar code label is attached to a vehicle or container of shipment transporting the bottle. In still even another of these embodiments, the bar code on the bar code label is associated with a sensor or RFID tag making the plurality of measurements and associated with the bottle. In yet another of these embodiments, the bar code allows a user to retrieve information associated with the bottle—such as a description of provenance or the plurality of measurements—by transmitting the bar code to a server 106 as described in greater detail below.

The radio-frequency identification tag stores the plurality of measured values of the environmental condition (step 304). In one embodiment, the RFID tag 220 stores a bottle tag identification number associated with a bottle to which the RFID tag 220 is attached. In another embodiment, the RFID tag 220 stores a bottle tag identification number identifying a bottle with which the RFID tag 220 is associated. In still another embodiment, the RFID tag 220 stores an identification of a second RFID tag 220' with which the bottle is associated; for example, the RFID tag 220 may store an identification of an RFID tag 220' attached to a case storing the bottle. In still even another embodiment, the RFID tag 220 stores data that authenticates the bottle, including, but not limited to, the bottle tag identification number, an identification number associated with a code imprinted on a neck seal on the bottle, and other identifiers, such as lot numbers. In still even another embodiment, the RFID tag 220 stores the plurality of measured values in an encrypted format. In yet another embodiment, the RFID tag 220 transmits, to a reader 210, the plurality of measured values.

A server receives the plurality of measured values for analysis (step 306). In one embodiment, a reader 210 queries the RFID tag 220, receives the plurality of measured values, and transmits the plurality of measured values to the server 106. In another embodiment, the reader 210 queries the RFID tag 220, receives the plurality of measured values and transmits the plurality of measured values to a database storing measured values. In still another embodiment, the server 106 retrieves a stored plurality of measured values from a database of measured values. In yet another embodiment, the server 106 receives the plurality of measured values from a second server 106'. In some embodiments, a member of a distribution channel, such as an end customer purchasing a bottle of an alcoholic beverage, can remove and ship a temperature-sensing RFID tag 220 to a centralized location from which the plurality of measured values are transmitted to the server 106.

In some embodiments, a reader 210 retrieves a plurality of measured values from the RFID tag 220. In one of these embodiments, the reader 210 transmits the plurality of measured values to the server 106. In another of these embodiments, the reader 210 includes a software program for retrieving data from an RFID tag 220 and for transmitting the retrieved data to a computing device 100. In still another of these embodiments, the reader 210 transmits the plurality of measured values to a second server 106', which includes a software program for retrieving data from an RFID tag 220 and for transmitting the retrieved data to a computing device 100. In yet another of these embodiments, the second server 106' transmits the plurality of measured values to the server 106.

In some embodiments, a reader 210 transmits a plurality of measured values to a local registry. In one of these embodiments, a database stores a local registry. In another of these embodiments, a server 106' stores a local registry. In other embodiments, a reader 210 transmits a plurality of measured values to a global registry. In one of these embodiments, a database stores a global registry. In another of these embodiments, a server 106 stores a global registry. In still other embodiments, a central server 106 includes a global registry receiving a copy of the data—including a plurality of measured values—stored by a local registry. In still other embodiments, a local registry resides at a winery or other facility for producing alcoholic beverages and communicates with a global registry residing on a centralized server. In one of these embodiments, the local registry and the global registry communicate over a network 104 as described above in connection with FIGS. 1A-1B.

The server provides, via a user interface, a description of a provenance of an alcoholic beverage in the bottle, the description generated responsive to an analysis of the received plurality of measured values (step 308). In one embodiment, the server analyzes the plurality of measured values. In another embodiment, the server generates statistical data responsive to the analysis of the plurality of measured values. In still another embodiment, the server generates a description of a provenance of the alcoholic beverage in the bottle, responsive to an analysis of the statistical data and the plurality of measured values. In yet another embodiment, the server verifies the authenticity of the bottle and the contents by verifying that a bottle identification number and a neck seal identification number received via the user interface were registered to the winery or alcohol-bottling facility producing the alcoholic beverage.

In some embodiments, data is generated based upon the environmental measures received from the RFID tag. In one of these embodiments, the data is analyzed based on research of various conditions of alcoholic beverages caused by various environmental conditions, including research on the impact of temperatures on the quality of alcoholic beverages such as wine. In another of these embodiments, the data is also provided as raw data across timelines for further analysis by the recipient if desired.

In some embodiments, the server selects the description of provenance from a plurality of stored descriptions. In one of these embodiments, the server applies criteria associated with a stored description to the plurality of measured values to determine whether to select the stored description. In another of these embodiments, the server applies criteria associated with a stored description to the statistical data to determine whether to select the stored description. In other embodiments, the server 106 selects the description of provenance from the plurality of stored descriptions based upon a determination that the plurality of measured values fall within a range of values associated with the selected descriptions; for example, a plurality of temperature values may fall within a range of values associated with a description of provenance indicating that the temperature of the bottle during the bottle's progress through a distribution channel was maintained at an acceptable level.

In some embodiments, the server 106 generates the description of provenance of the alcoholic beverage. In other embodiments, the server 106 provides, via the user interface, a display of the plurality of measured values. In still other embodiments, the server 106 provides, via the user interface, a display of statistical data generated responsive to the plurality of measured values.

In one embodiment, the server 106 generates and maintains the user interface. In another embodiment, the server 106 communicates with a user's computer, such as a client 102, to display the user interface to the user; for example, the server 106 may be a web server transmitting to a client 102 the data needed to display the user interface to the user. In still another embodiment, the server 106 displays the user interface directly to the user; for example, the server 106 may reside at a winery producing wine and a user may access the server 106 directly.

In one embodiment, the server 106 provides the user interface that is displayed to a purchaser of the bottle. In another embodiment, the server 106 provides the user interface that is displayed to a producer of the bottle. In still another embodiment, the server 106 provides the user interface that is displayed to a distributor of the bottle. In yet another embodiment, the server 106 provides the user interface that is displayed to a member of a distribution channel through which the bottle travels. In some embodiments, the server 106 provides a unique user interface for display to a member of a distribution channel through which the bottle travels, the user interface displaying information of relevance to that member of the distribution channel.

In other embodiments, the server 106 displays the user interface upon receiving a request. In one of these embodiments, the server 106 displays the certification of provenance upon receiving, from a user such as an end user or a member of a distribution channel, an identification number associated with a bottle and a request for a certification of provenance of an alcoholic beverage contained in the bottle. In another of these embodiments, the user making the request and transmitting an identification number does so using a client 102, which may be a computer, a handheld computing device, a mobile phone, a smartphone, or other device as described above in connection with FIG. 1A-1B. The client 102 may execute bar code reader software to scan a bar code on the bottle and transmit the scanned information to the server 106. In still another embodiment, the client 102 may be a bar code reader or RFID tag reader scanning information from the bottle for transmission to the server 106. In still even another embodiment, the client 102 may be in communication with a bar code reader or RFID tag reader; for example, the bar code or RFID tag reader may be connected to the client 102 via a universal serial bus (USB). In yet another embodiment, a user manually enters an identification number included on the bottle into the client 102 for transmission to the server 106.

In some embodiments, providing the plurality of measured values, the statistical data generated from the plurality of measured values, and the description of provenance of the alcoholic beverage offers unique advantages to each member of the distribution channel. In one of these embodiments, a producer of the alcoholic beverage, such as a winemaker, knows that its bottles have been shipped appropriately and that the alcoholic beverage received will taste as it did in the facility for producing the alcoholic beverage, such as the winery. Hence, the expert reviews received will be accurate to the product as it was produced. In another of these embodiments, the importer will know that the bottles did not languish on the docks in the hot sun—or other intemperate setting—before shipping. In still another of these embodiments, the retailer will know that the bottles he received were housed in an appropriately refrigerated warehouse after shipping and before reaching his own storage facility. In still even another of these embodiments, the end customer will know—based on identification numbers associated with the bottle—that he or she does indeed have the bottle he or she purchased and that it was appropriately handled during shipment. In still another of these embodiments, members of the distribution channel may view data specific to them at devices appropriate to their location. For example, and in yet another of these embodiments, a supplier can view the data from an office desktop computer, a retailer will be able to view it on a handheld inventory device with internet access and consumers will be able to view their data on cell phones equipped with internet access as the consumer ponders potential additions to their cellars while in a liquor store.

In some embodiments, the RFID tag 220 measures, periodically, a plurality of values of an environmental condition of a bottle stored in inventory. In one of these embodiments, the RFID tag 220 measures a plurality of values of an environmental condition of a bottle after a consumer has purchased the bottle and stores it in inventory, such as in the consumer's wine cellar. In another of these embodiments, the RFID tag 220 measures a plurality of values of an environmental condition of a bottle before the bottle enters a distribution chain; for example, a chateau or other facility producing alcoholic beverages may store the bottle in inventory before selling, shipping, or otherwise distributing the bottle and during this time, the RFID tag 220 may periodically measure the plurality of values of the environmental conditions of the bottle. In other embodiments, the server provides, via the user interface, a description of a provenance of the alcoholic beverage in the bottle, the description generated responsive to an analysis of a plurality of measured values received while the bottle was in inventory.

Figure 4A:
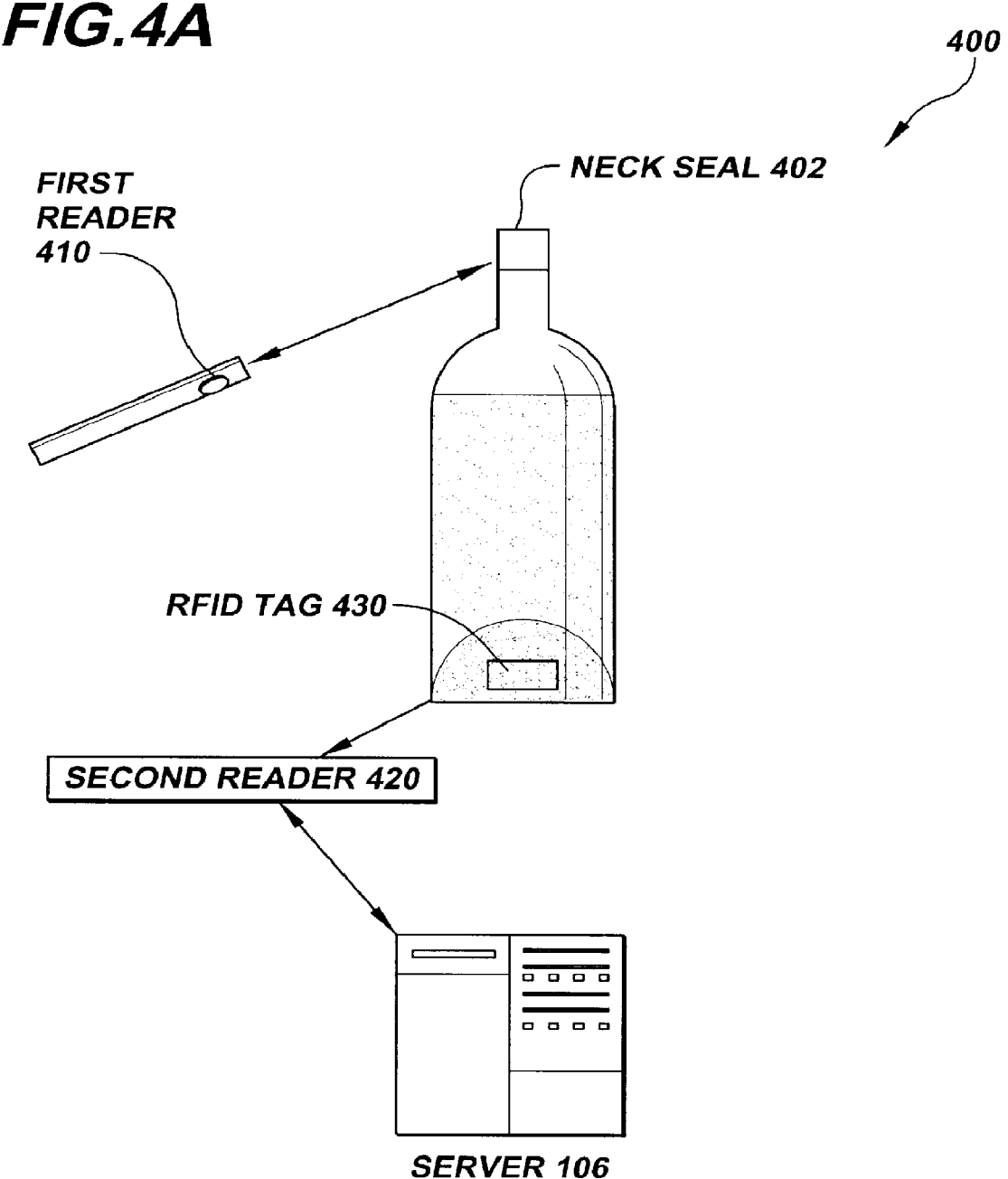
FIG. 4A is a block diagram depicting one embodiment of a system for authenticating contents of a bottle containing an alcoholic beverage during its progress through a distribution channel.

Referring now to FIG. 4A, a block diagram depicts one embodiment of a system for authenticating contents of a bottle containing an alcoholic beverage during its progress through a distribution channel. The system includes a neck seal 402, a first reader 410, a second reader 420, and a server 106. The neck seal 402 is attached to a bottle containing an alcoholic beverage and includes a neck seal identification number and an invisible security taggant. The first reader 410 periodically scans the neck seal 402, detects the presence of the security taggant, and authenticates the neck seal. The second reader 420 periodically retrieves, from a radio-frequency identification tag 430, a bottle tag number. The server 106 receives the retrieved bottle tag number, and authenticates the contents of the bottle responsive to identifying an association between the retrieved bottle tag number and a neck seal identification number inscribed on the neck seal 402. In one embodiment, an internet-based user interface receives, from a user, the neck seal identification number and the bottle tag number and transmits, to the server 106, the neck seal identification number and the bottle tag number for use in authenticating the contents of the bottle.

In some embodiments, the neck seal 402 and the RFID tag, which may be an RFID tag 220 as described above in connection with FIGS. 2A-2D and FIG. 3, combine to form a system for authenticating the contents of the bottle and for certifying provenance of the alcoholic beverage contained in the bottle. In one of these embodiments, a user—such as an end user purchasing the bottle, or a member of a distribution channel through which the bottle travels—verifies that the alcoholic beverage in the bottle is authentic by verifying that the neck seal shows no sign of tampering. For example, and in another of these embodiments, if a user scans the neck seal with a first reader 410 and the first reader 410 provides an indication that the security taggant is present on the neck seal, the user may conclude that the neck seal is the neck seal placed on the bottle during the bottling process and that the alcoholic beverage in the bottle is authentic. In another of these embodiments, if a user scans the neck seal with a first reader 410 and the first reader 410 provides an indication that the security taggant is not present on the neck seal, the user may conclude that the neck seal is not the neck seal placed on the bottle during the bottling process and that someone may have replaced the neck seal with a different neck seal, calling into question the authenticity of the alcoholic beverage in the bottle. In still another of these embodiments, the user may verify authenticity of an alcoholic beverage in a bottle by verifying that an identification number imprinted on the neck seal matches an identification number assigned to the bottle during a bottling process. In still even another of these embodiments, the user may verify that the neck seal identification number matches a bottle tag number stored in the RFID tag 430 during the bottling process. In yet another of these embodiments, the user may determine provenance of the alcoholic beverage by providing a server 106 with information about the bottle—such as the neck seal identification number, which may be associated with the RFID tag 430 storing data regarding environmental conditions of the bottle—and receive a certification of the provenance of the alcoholic beverage by the server 106.

In some embodiments, the system includes a first RFID tag 430, a neck seal 402, a second RFID tag 430', at least one identification number, at least one database, and at least one user interface. In one of these embodiments, the first RFID tag 430 and the second RFID tag 430' are both associated with the bottle. For example, the first RFID tag 430 may be attached to the bottle and the second RFID tag 430' may be attached to a case storing the bottle. In another of these embodiments, the at least one identification number is a neck seal identification number laser-etched onto the neck seal 402 of the bottle. In still another of these embodiments, the at least one registry and the at least one user interface are the registries and user interfaces described above in connection with FIGS. 2A-2D and FIG. 3. In some embodiments, the system includes a bar code label imprinted with a bar code associated with at least one RFID tag 430. In one of these embodiments, the bar code is imprinted on a label affixed to the bottle and is associated with an RFID tag 430 attached to a case storing the bottle.

Although only a single neck seal 402, RFID tag 430 and server 106 are described in FIG. 4A, it should be understood that the system may provide one or more of each of these components. In some embodiments, the system includes only a subset of these components, unbundled in different combinations for different implementations in the market place so that the components of the system may be used on their own or in combination with others of the system components.

Figure 4B:
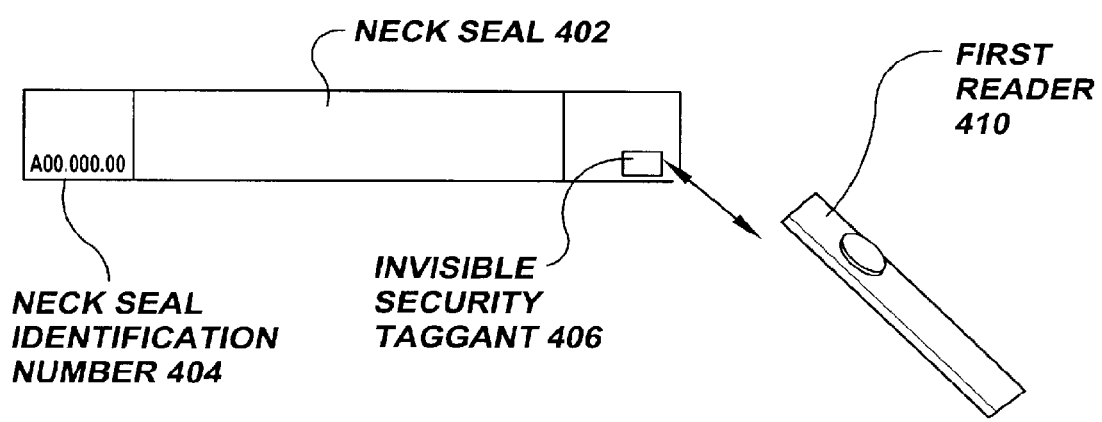
FIG. 4B is a block diagram depicting one embodiment of a neck seal attached to a bottle containing an alcoholic beverage.

Referring now to FIG. 4B, a block diagram depicts one embodiment of a neck seal attached to a bottle. In one embodiment, the neck seal 402 includes a neck seal identification number 404 and an invisible security taggant 406. In another embodiment, the neck seal identification number 404 is printed on the outer facing of the neck seal 402. In still another embodiment, the neck seal identification number 404 may be printed on the neck seal either in human-readable form or encoded in a barcode. In yet another embodiment, the neck seal 402 is a neck seal having a tamperproof construction and attached to the bottle with a tamperproof adhesive.

In some embodiments, the invisible security taggant 406 is a physical marker, such as a chemical marker, deposited on the neck seal 402. In other embodiments, the invisible security taggant 406 includes an authentication code detectable by the first reader. In still other embodiments, the invisible security taggant 406 is printed on the lining of the neck seal 402. In yet other embodiments, the invisible security taggant 406 is a chemical marker mixed with ink, coating or other media and applied to the neck seal. In one of these embodiments, the invisible security taggant 406 is a taggant such as those manufactured by InkSure Technologies, Inc., of Fort Lauderdale, Fla., or by SICPA of Lausanne, Switzerland. In some embodiments, the first reader 410 is a reader for the detection of covert codes provided as part of a taggant authentication solution, such as those manufactured by InkSure Technologies, Inc., of Fort Lauderdale, Fla., or by SICPA of Lausanne, Switzerland.

In some embodiments the neck seals are produced with the security taggant and the neck seal identification number printed on them. In one of these embodiments, a bar code identification number that includes the neck seal identification number is printed on the liner of the neck seal. In another of these embodiments, the bar code is printed in invisible ink. In still another of these embodiments, at the point of manufacture of the neck seal, a data file is created identifying the association between the neck seal identification number and the bar code. In still even another of these embodiments, to enhance security, by limiting the time between neck seal production and their application to the bottle, the data file is not created until the bottles are in production. In still another of these embodiments, when the bottle tags are shipped, a file associated with the tags is transmitted to a global registry. In yet another of these embodiments, the tags are also associated with a facility—such as a winery—and the global registry will register the tags to that facility; for example, if a winery has chosen to store all of its data at the global registry and not to maintain a local registry, the global registry may associate specific tags with the winery using those tags.

In some embodiments, the neck seal 402 has a bar code that includes the same number as the neck seal identification number 404. In one of these embodiments, the bar code enables the transmission of the neck seal identification number 404 to a server 106 or to a component on a bottling line. In another of these embodiments, the bar code is associated with a bottle tag number stored by the RFID tag 430. In other embodiments, the neck seal identification number 404 is printed directly on the neck seal 402 by a component in a bottling line having the ability to transmit the neck seal identification number 404 to other components in the bottling line. In still other embodiments, the neck seal identification number 404 is associated with a bottle tag number during a bottling process.

In other embodiments, the neck seal identification number 404 is further secured by not printing this number on the neck seal 402 until the point of attachment of the neck seal to the bottle. In one of these embodiments, a supplier produces a neck seal 402 including the security taggant 406 but not including the neck seal identification number 404. In another of these embodiments, no data file is generated or transmitted regarding associations between the neck seal identification number and the bottle tag number because the information will not be printed on the neck seal and the association will not be made until the neck seal is applied to the bottle during a subsequent bottling process. During the bottling process, when the neck seal is applied to the bottle, a module in the bottling process prints the neck seal identification number 404 on the neck seal 402. The neck seal identification number is associated with a bottle tag number stored on an RFID tag 430 during the bottling process and the two numbers are linked in the global registry.

In one embodiment, the neck seal 402 includes a bar code associated with the bottle tag number stored by the radio-frequency identification tag attached to the bottle. In another embodiment, the system includes a third reader scanning the bar code and transmitting the scanned code to the server. In still another embodiment, a bar code reader scans the bar code. In yet another embodiment, the server 106 includes an authentication module receiving the scanned bar code and the retrieved bottle tag number and authenticating the contents of the bottle responsive to identifying an association between the scanned bar code and the retrieved bottle tag number. In some embodiments, the server 106 generates a user interface displaying, to a purchaser of the bottle, a description of the provenance of the alcoholic beverage, responsive to the authentication of the contents of the bottle.

Figure 4C:
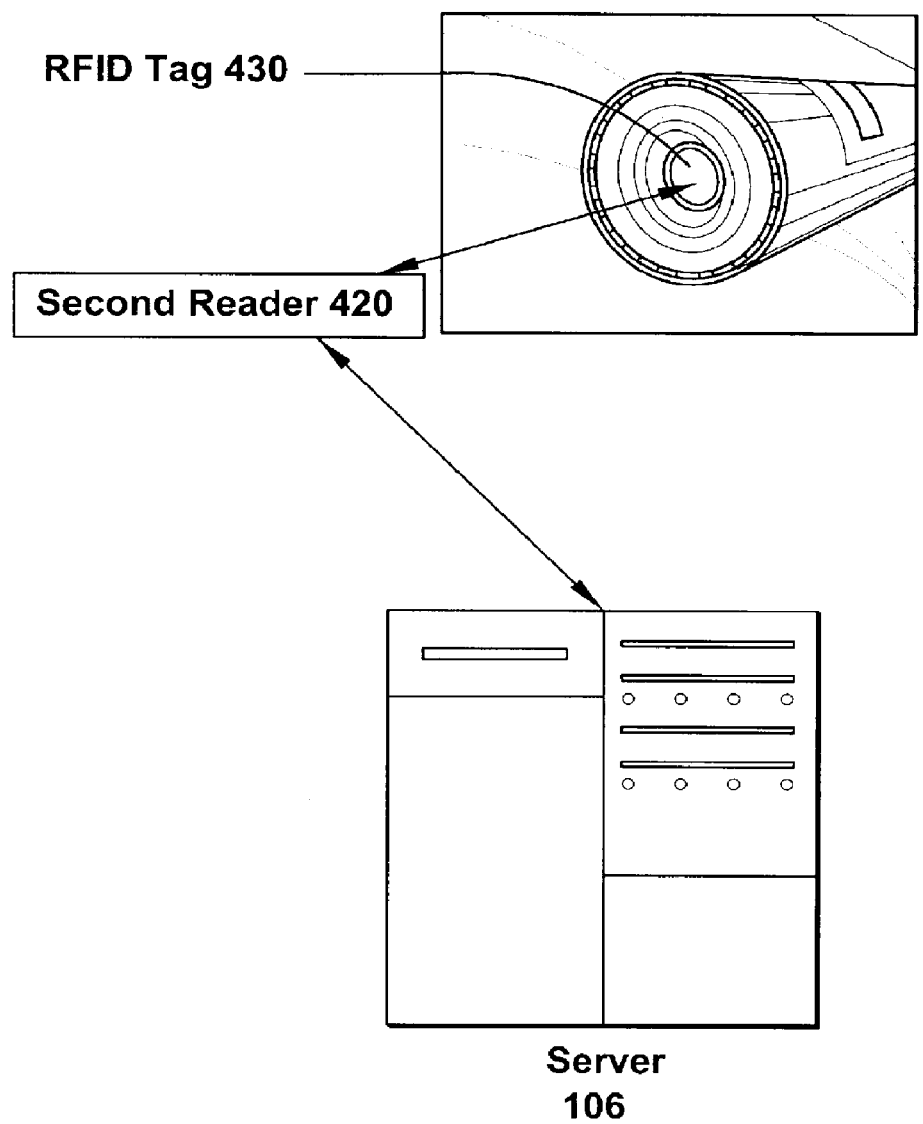
FIG. 4C is a block diagram depicting one embodiment of a reader retrieving, from a radio-frequency identification tag, a bottle tag number and transmitting the retrieved bottle tag number to a server.

Referring now to FIG. 4C, a block diagram depicts one embodiment of a reader retrieving, from a radio-frequency identification tag, a bottle tag number and transmitting the retrieved bottle tag number to a server. In some embodiments, the RFID tag 430 is an RFID tag 220 as described above in connection with FIGS. 2A-2D and FIG. 3. In one embodiment, the bottle tag number is a unique product code identifying the bottle with which the RFID tag 430 is associated. In another embodiment, the second reader 420 is an RFID tag reader, such as the reader 210 described above in connection with FIGS. 2A-2D and FIG. 3. In still another embodiment, the second reader 420 includes both an RFID tag reader and a bar code reader. In still another embodiment, the bottle tag number is a unique ID number encoded by a manufacturer of the bottle tag. In still even another embodiment, a list of bottle tag numbers are stored in a local registry; for example, a winery may store a list of bottle tag numbers stored by RFID tags associated with bottles of wine distributed by the winery. In yet another embodiment, the bottle tag numbers are confidential and stored securely. In some embodiments, the RFID tag 430 stores a bottle tag number associated with the neck seal identification number 404.

Figure 5:
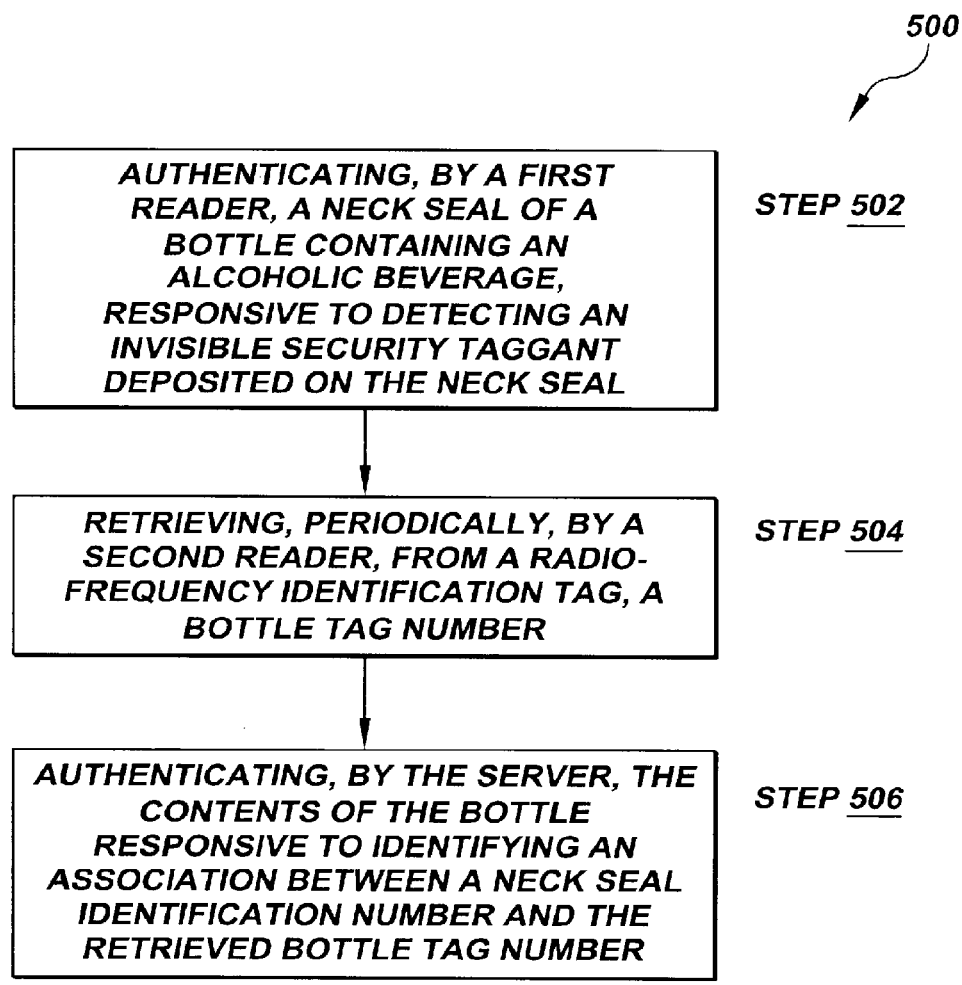
FIG. 5 is a flow diagram depicting one embodiment of the steps taken in a method for authenticating contents of a bottle containing an alcoholic beverage during its progress through a distribution channel.

Referring now to FIG. 5, a flow diagram depicts one embodiment of the steps taken in a method for authenticating contents of a bottle containing an alcoholic beverage during its progress through a distribution channel. The method includes the step of authenticating, periodically, by a first reader, a neck seal of a bottle containing an alcoholic beverage, responsive to detecting an invisible security taggant deposited on the neck seal (step 502). The method includes the step of retrieving, periodically, by a second reader, from a radio-frequency identification tag, a bottle number (step 504). The method includes the step of authenticating, by a server, the contents of the bottle, responsive to identifying an association between a neck seal identification number imprinted on the neck seal and the retrieved bottle tag number (step 506).

Referring now to FIG. 5, and in greater detail, a first reader periodically authenticates a neck seal of a bottle containing an alcoholic beverage, responsive to detecting an invisible security taggant deposited on the neck seal (step 502). In one embodiment, the first reader 410 scans the neck seal 402 to detect the presence of the invisible security taggant upon receipt of the bottle by a channel member.

In one embodiment, the taggant is covert and cannot be seen by the naked eye nor can it be illuminated with UV black lights or infrared laser pens. In another embodiment, a taggant-detection formula is forensic, utilizing the analytical technique of spectrophotometry, which measures unique frequencies that selectively excite certain substances and the different frequencies that are then emitted by the excited substances. In some embodiments, a plurality of different data points are used to measure the emissions from the selected illuminated frequency wavelengths. In one of these embodiments, all of the data points must match for a positive read. In another of these embodiments, a majority of the data points must match for a positive read. In other embodiments, if a counterfeiter used a spectrophotometer, he may be able to identify certain fluorescent emissions, but it will not reveal the specific profile for which the authenticator is programmed. Additionally, some emissions from the ink or substrate (e.g., the label material) may look like part of a unique code but are not. In still other embodiments, a method for deciphering the code is unique to the ink, taggant and label material.

In one embodiment, the first reader 410 verifies the presence of the invisible security taggant and a code, such as the neck seal identification number. In another embodiment, the first reader 410 verifies only the presence of the invisible security taggant. In another embodiment, the first reader 410 displays a first visual sign—such as a green light—if the first reader 410 detects the presence of the invisible security taggant. In still another embodiment, the first reader 410 displays a second visual sign—such as a red light—if the first reader 410 fails to detect the presence of the invisible security taggant, or if it detects a counterfeit security taggant.

In some embodiments, the first reader 410 scans data such as a bar code or data encoded by the taggant into a computing device 100. In one of these embodiments, the computing device 100 executes software that connects to the reader(s) as well as to the global registry via the internet. In another of these embodiments, the software collects the data from the reader for transmission to the global registry. In still another of these embodiments, the software performs a batch upload of collected data to the global registry.

In one embodiment, by using the first reader 410 to detect the presence of the invisible security taggant 406 on the neck seal, a user of the first reader 410—such as a purchaser of the bottle or a member of a distribution channel through which the bottle travels—determines that the neck seal 402 on the bottle is the original neck seal placed on the bottle during a bottling process and that the neck seal has not been tampered with or replaced by a counterfeit neck seal. In another embodiment, by determining that the neck seal 402 is the original neck seal and not a counterfeit neck seal, the user of the first reader 410 increases his or her confidence in the authenticity of the alcoholic beverage in the bottle. Conversely, and in still another embodiment, if the user of the first reader 410 determines that the neck seal 402 is not the original neck seal—by determining that the neck seal does not include the security taggant—then the user may question the authenticity of the alcoholic beverage in the bottle and seek additional information to confirm that the alcoholic beverage itself has not been tampered with or replaced with a counterfeit beverage.

A second reader retrieves, from a radio-frequency identification tag, a bottle number (step 504). In one embodiment, the second reader retrieves the bottle tag number from the radio-frequency identification tag, upon receipt of the bottle by a channel member. In another embodiment, the second reader transmits the retrieved bottle tag number to a server 106 for authentication of the bottle.

In some embodiments, a user such as an authorized channel member—uses the second reader to confirm that other members of the distribution channel have maintained a level of shipment and storage quality required by the authorized channel member. In one of these embodiments, the second reader 420 retrieves data including, but not limited to, one of an association of a bottle tag number with a neck seal identification number 404, an association with the unique, laser-etched number on the bottle, and data associated with the contents of the bottle, such as lot, vintage, and bottling date. In another of these embodiments, the second reader 420 retrieves a plurality of measured values of environmental conditions of the bottle. In still another of these embodiments, shipment and storage quality are discerned from an analysis of a plurality of measured values on environmental conditions such as temperature, light, vibration and humidity, as described above in connection with FIGS. 2A-2D and FIG. 3.

In some embodiments, after the RFID tag reader 420 reads the data for a particular bottle or case, this data is then sent by the reader 420 to a computing device 100. In one of these embodiments, the computing device 100 is a server 106 authenticating the bottle responsive to the received data. In another of these embodiments, the computing device 100 is an intermediate machine between the second reader 420 and the server 106, such as a laptop owned or rented by a channel member. In still another of these embodiments, this computing device 100 executes a software application retrieving data from the RFID tag reader 420 and transmitting the retrieved data to the server 106.

A server authenticates the contents of the bottle, responsive to identifying an association between a neck seal identification number imprinted on the neck seal and the retrieved bottle tag number (step 506). In some embodiments, the server authenticates the contents of the bottle, responsive to identifying an association between a neck seal identification number 404 and the retrieved bottle tag number. In one of these embodiments, during a bottling process, the bottle tag number is associated with the neck seal identification number 404. In another of these embodiments, the association between the bottle tag number and the neck seal identification number 404 is stored in a database accessible to the server 106. In still another of these embodiments, upon receiving the retrieved bottle tag number and the neck seal identification number 404—either directly from a purchaser of the bottle or indirectly via a reader 420 or from an intermediate machine 100—the server accesses a database to determine whether the retrieved bottle tag number and the neck seal identification number 404 are associated with each other. In still even another of these embodiments, an internet-based user interface receives, from a user, the neck seal identification number and the bottle tag number and transmits the received identification numbers to the server 106. In yet another of these embodiments, the server authenticates the contents of the bottle responsive to accessing a database and verifying the association between the neck seal identification number 404 and the retrieved bottle tag number.

In some embodiments, the server authenticates the contents of the bottle, responsive to identifying an association between a bar code inscribed on the neck seal and the retrieved bottle tag number. In one of these embodiments, during a bottling process, the bottle tag number is associated with a bar code inscribed on the neck seal. In another of these embodiments, a third reader scans the bar code. In still another of these embodiments, the server receives the scanned bar code and the bottle tag number. In still even another of these embodiments, an internet-based user interface receives, from a user, the neck seal identification number and the bottle tag number and transmits the received numbers to the server 106. In yet another of these embodiments, the server authenticates the contents of the bottle responsive to identifying an association between the scanned bar code and the retrieved bottle tag number.

In some embodiments, a user of a second reader 420 scans an RFID tag 430 associated with a bottle and requests authentication of the contents of the bottle from a server. In one of these embodiments, the user also provides the server with a neck seal identification number 404 read from a neck seal 402 on the bottle. In another of these embodiments, the user verifies that the neck seal 402 is the original neck seal placed on the bottle during a bottling process by confirming that the neck seal identification number 404 is the same number that was associated, during the bottling process, with a bottle tag number stored in the RFID tag 430. In still another of these embodiments, the user may conclude that the contents of the bottle are authentic by confirming that the identification numbers on the neck seal and in the RFID tag are authentic.

In one embodiment, the server 106 provides, via a user interface, to a purchaser of the bottle, a description of the provenance of the alcoholic beverage contained in the bottle, responsive to the authentication of the contents of the bottle. In one embodiment, the server receives at least one identification number associated with a bottle from a channel member with a request for certification of provenance of the bottle. In another embodiment, the server receives at least one identification number associated with a bottle from a channel member with a request for authentication of the contents of a bottle.

In some embodiments, an authorized channel member uses a computing device 100 executing an application for retrieving data from a reader and storing the data. In one of these embodiments, the computing device 100 is a laptop executing proprietary software applications for retrieving and storing the data. In another of these embodiments, the computing device 100 can connect directly to the reader(s) and can transmit retrieved data, via the internet, to a server 106, which may include a global registry storing data associated with at least one bottle. In still another of these embodiments, the computing device 100 retrieves the data from the reader and uploads the retrieved data to the global registry; for example, the computing device 100 may perform a batch upload of data retrieved from at least one reader to the global registry provided by a server 106. In still even another of these embodiments, an authorized channel member may use the application program to securely view descriptions of provenance, authenticity, and other information associated with bottles or cases of bottles that was retrieved and uploaded using the reader 410 or the reader 420. In yet another of these embodiments, an authorized channel member uses at least one authentication credential, such as an identification number or password, to authenticate themselves to a server 106 and securely access the information.

The systems and methods described above may be provided as one or more computer-readable programs embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, LISP, PERL, C, C++, PROLOG, or any byte code language such as JAVA. The software programs may be stored on or in one or more articles of manufacture as object code.

Having described certain embodiments of methods and systems for certifying provenance of alcoholic beverages, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for certifying provenance of an alcoholic beverage by tracking environmental conditions of a container for the alcoholic beverage during its progress through a distribution channel, the method comprising the steps of:
   (a) measuring periodically a plurality of values of a plurality of environmental conditions of the container, wherein one or more of the plurality of environmental conditions are measured at distinct locations during the progression of the container through the distribution channel;
   (b) storing the plurality of measured values of the environmental conditions;
   (c) receiving, by a server, the plurality of measured values for analysis; and
   (d) generating, by the server, based on an analysis of the received plurality of measured values a grading of a provenance of the alcoholic beverage in the container, the grading selected from three or more provenance grades and traceably authenticating the storage history of the container during the progression of the container through the distribution channel.

2. The method of claim 1, wherein step (a) further comprises measuring, upon receipt of the container by a channel member, the values of the environmental conditions of the container.

3. The method of claim 1, wherein step (a) further comprises measuring, during transit to a channel member, the values of the environmental conditions of the container.

4. The method of claim 1, wherein step (a) further comprises measuring, periodically, a value of an environmental condition of the container.

5. The method of claim 1, wherein step (a) further comprises measuring, periodically, by a radio-frequency identification tag attached to a case a value of an environmental condition of the container.

6. The method of claim 1, wherein step (a) further comprises measuring, periodically, a value of an environmental condition of the shipping pallet including the container.

7. The method of claim 1, wherein step (a) further comprises measuring an ambient temperature of the container.

8. The method of claim 1, wherein step (a) further comprises measuring a level of humidity.

9. The method of claim 1, wherein step (a) further comprises measuring a level of vibration of the container.

10. The method of claim 1, wherein step (a) further comprises identifying a location of the container.

11. The method of claim 10, wherein step (a) further comprises identifying, by a global positioning system receiver attached to the container, a location of the container.

12. The method of claim 1 further comprising the step of storing a container tag identification number.

13. The method of claim 1 further comprising the step of storing an identification number associated with a code imprinted on a seal on the container.

14. The method of claim 1, wherein step (b) further comprises encrypting a plurality of measured values of the environmental conditions.

15. The method of claim 1, wherein step (c) further comprises transmitting the plurality of measured values to the server.

16. The method of claim 1, wherein step (c) further comprises the steps of:
   (c-1) transmitting the plurality of measured values, responsive to a received query; and
   (c-2) transmitting to a server the received plurality of measured values.

17. The method of claim 1, wherein step (c) further comprises receiving, by a server operated by a facility producing the alcoholic beverage, the plurality of measured values for analysis.

18. The method of claim 1 further comprising transmitting to a client device for display to a user via a user interface, the generated provenance grading.

19. The method of claim 1 wherein transmitting the generated provenance grading is performed by a second server.

20. The method of claim 1 further comprising transmitting to a smart phone for display to a user via a user interface, the generated provenance grading.

* * * * *